(12) United States Patent
Liljestrand

(10) Patent No.: US 9,822,686 B2
(45) Date of Patent: Nov. 21, 2017

(54) METHOD PERTAINING TO AN SCR SYSTEM AND AN SCR SYSTEM

(71) Applicant: Scania CV AB, Södertälje (SE)

(72) Inventor: Andreas Liljestrand, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/772,428

(22) PCT Filed: Mar. 3, 2014

(86) PCT No.: PCT/SE2014/050253
§ 371 (c)(1),
(2) Date: Sep. 3, 2015

(87) PCT Pub. No.: WO2014/137273
PCT Pub. Date: Sep. 12, 2014

(65) Prior Publication Data
US 2016/0032804 A1  Feb. 4, 2016

(30) Foreign Application Priority Data
Mar. 7, 2013 (SE) ...................................... 1350271

(51) Int. Cl.
*F01N 3/028* (2006.01)
*F01N 3/20* (2006.01)
(Continued)

(52) U.S. Cl.
CPC ............... *F01N 3/208* (2013.01); *F01N 3/24* (2013.01); *F01N 9/00* (2013.01);
(Continued)

(58) Field of Classification Search
CPC ......... F01N 2610/02; F01N 2900/1404; F01N 2900/1411; F01N 3/208; Y02T 10/24
(Continued)

(56) References Cited

U.S. PATENT DOCUMENTS

2008/0066453 A1  3/2008  Oberski et al. ................. 60/286
2009/0104085 A1*  4/2009  Ichikawa ................ F01N 3/208
                                                        422/112
(Continued)

FOREIGN PATENT DOCUMENTS

DE  10 2004 050 023 A1  4/2006
DE  10 2010 030 854 A1  1/2012
(Continued)

OTHER PUBLICATIONS

International Search Report dated Jun. 12, 2014 in corresponding PCT International Application No. PCT/SE2014/050253.
(Continued)

*Primary Examiner* — Patrick Maines
(74) *Attorney, Agent, or Firm* — Ostrolenk Faber LLP

(57) ABSTRACT

A method for an SCR system comprising a dosing unit (250) for dosing reducing agent into an engine exhaust duct (290) upstream of a SCR catalytic converter (270) for reducing the NOx level in an exhaust flow from the engine. The SCR system comprises a pressurizing device (230) for feeding reducing agent from a container (205) to the dosing unit (250) arranged so as to dose reducing agent to the exhaust duct (290) under pressure. The method includes the step of: reducing, during periods of non-continuous dosing of reducing agent during continued maintained operation of the pressurizing device (230), the pressure (s301; s320) of the reducing agent at the dosing unit (250) compared to the pressure during continuous dosing. Also a computer program product containing program code (P) for a computer (200; 210) for implementing a method according to the invention. The invention also concerns an SCR system and a motor vehicle that is equipped with that system.

20 Claims, 6 Drawing Sheets

(51) Int. Cl.
*F01N 3/24* (2006.01)
*F01N 9/00* (2006.01)

(52) U.S. Cl.
CPC .. *F01N 2610/144* (2013.01); *F01N 2610/146* (2013.01); *F01N 2610/1473* (2013.01); *F01N 2900/1808* (2013.01); *F01N 2900/1822* (2013.01); *Y02T 10/24* (2013.01); *Y02T 10/47* (2013.01)

(58) Field of Classification Search
USPC .................. 60/273, 274, 285, 286, 295, 301
See application file for complete search history.

(56) References Cited

U.S. PATENT DOCUMENTS

| | | | | |
|---|---|---|---|---|
| 2009/0301068 | A1* | 12/2009 | Fujita | F01N 3/208 60/286 |
| 2010/0082224 | A1 | 4/2010 | Stretch | 701/103 |
| 2010/0172816 | A1 | 7/2010 | Mayer et al. | 423/352 |
| 2012/0047880 | A1 | 3/2012 | Leonard et al. | 60/295 |
| 2013/0340409 | A1* | 12/2013 | Hodgson | F01N 3/08 60/274 |
| 2014/0150409 | A1* | 6/2014 | George | F01N 9/00 60/274 |
| 2014/0331647 | A1* | 11/2014 | Liljestrand | F01N 3/208 60/274 |

FOREIGN PATENT DOCUMENTS

| | | | |
|---|---|---|---|
| DE | 102010031660 A1 * | 1/2012 | ........... F01N 3/2066 |
| DE | 102011003599 A1 * | 8/2012 | ............ F01N 3/208 |
| EP | 1 992 397 A1 | 11/2008 | |
| EP | 2 093 422 A1 | 8/2009 | |
| WO | WO 03/100225 A1 | 12/2003 | |
| WO | WO 2007/000170 A1 | 1/2007 | |
| WO | WO 2009/121644 A1 | 10/2009 | |

OTHER PUBLICATIONS

European Search Report, dated Sep. 21, 2017, issued in corresponding European Patent Application No. 14 759 694.4. Total 5 pages.

* cited by examiner

METHOD PERTAINING TO AN SCR SYSTEM AND AN SCR SYSTEM

CROSS-REFERENCE TO RELATED APPLICATIONS

The present application is a 35 U.S.C. §§371 national phase conversion of PCT/SE2014/050253, filed Mar. 3, 2014, which claims priority of Swedish Patent Application No. 1350271-1, filed Mar. 7, 2013, the contents of which are incorporated by reference herein. The PCT International Application was published in the English language.

TECHNICAL FIELD

The present invention concerns a method for an SCR system comprising a dosing unit for dosing reducing agent into an engine exhaust duct. The invention also concerns a computer program product containing program code for a computer to implement a method according to the invention. The invention also concerns an SCR system and a motor vehicle that is equipped with the SCR system.

BACKGROUND

In vehicles today, e.g. urea is used as a reductant in SCR (Selective Catalytic Reduction) systems comprising an SCR catalytic converter, in which catalytic converter the reductant and $NO_x$ gas can react and be converted into nitrogen and water. Different types of reductants can be used in SCR systems. For example, AdBlue is one commonly occurring reductant.

One type of SCR system includes a container that contains a reducing agent. The SCR system also has a pump that is arranged to pump the reducing agent from the container via a suction tube and supply it under pressure via a pressurized tube to a dosing unit that is arranged in an exhaust system in the vehicle, such as in an exhaust pipe of the exhaust system that is arranged to conduct exhaust from a vehicle engine to the surroundings thereof. The dosing unit is arranged to inject a required amount of reducing agent into an exhaust system upstream of the SCR catalytic converter according to operating routines stored in a control unit in the vehicle.

The dosing can, for example, occur in a predetermined stroke, such as 1 Hz, in which the dosing unit is open for a given predetermined period of each stroke, whereupon reducing agent can thus be dosed under pressure.

There is a constant need to reduce the amount of emissions from engines in motor vehicles. This applies not least to heavy motor vehicles such as trucks and buses, as legal requirements for increasingly lower emissions are continuously being intensified. It is thus of the utmost importance that SCR systems in vehicles deliver quality function not to degrade performance.

No dosing of reducing agent into the exhaust system occurs in many operating cases for the vehicle, as active regeneration is not necessary all that often. One such operating case can be, for example, when the exhaust temperature of the vehicle is lower than a given predetermined temperature. At such low exhaust temperatures, dosed reducing agent will not react with the $NO_x$ gases in the exhaust from the engine. Another such operating case in which no dosing occurs can be when a prevailing temperature of a surface of or component in the exhaust duct from the vehicle engine is lower than a given predetermined temperature. Dosed reducing agent could not be vaporized to the desired extent in this case. Dosed reducing agent can then take the form of undesired deposits or crystals in the exhaust system, which can cause degraded vehicle performance. Measures to remove such deposits are both costly and time-consuming. In the worst case, parts of the exhaust system will need to be replaced, which is associated with very high costs. It should be noted that an aftertreatment system in, for example, a modern heavy vehicle currently accounts for a significant share of the total value of the vehicle.

The dosing unit is thus kept closed in many operating cases because the dosing of reducing agent is quite simply not desirable.

When the reducing agent in the SCR system is pressurized, undesirable leakage of reducing agent from the dosing unit to the exhaust duct can occur for various reasons, including during periods when the dosing unit is closed not to dose reducing agent. Under unfavorable conditions, such leakage can cause crystallization and/or deposits in the exhaust system, which can negatively affect the SCR system.

It is thus desirable to ensure that no or minimal leakage of reducing agent occurs when the dosing unit is closed.

US 20120047880, DE102010030854 and US20100082224 describe various aspects of SCR systems.

SUMMARY OF THE INVENTION

One object of the present invention is to provide a new and advantageous method for an SCR system to prevent the leakage of reducing agent when a dosing unit in the SCR system is closed.

Another object of the invention is to provide a new and advantageous SCR system and a new and advantageous computer program for an SCR system.

Yet another object of the invention is to provide a method, an SCR system and a computer program for an SCR system for achieving improved performance in a motor vehicle.

Yet another object of the invention is to provide a method, an SCR system and a computer program for an SCR system to reduce the risk of crystallization of reducing agent in an exhaust duct for conducting exhaust from an engine.

Yet another object of the invention is to provide a method, an SCR system and a computer program for an SCR system for reducing the risk of leakage of reducing agent from a dosing unit for reducing agent to an exhaust duct for conducting exhaust from an engine.

According to one aspect of the present invention, a method is provided for an SCR system comprising a dosing unit for dosing reducing agent into an engine exhaust duct upstream of an SCR catalytic converter for reducing the $NO_x$ level in an exhaust flow from the engine, wherein the SCR system contains a pressurizing device for feeding reducing agent from a container to the dosing unit arranged to dose the reducing agent to the exhaust duct under pressure. The method comprises the step of:

reducing, during periods of non-continuous dosing of reducing agent during continued maintained operation of the pressurizing device, the pressure of the reducing agent at the dosing unit compared to the pressure during continued dosing.

According to one aspect of the present invention, a method is provided for an SCR system for purifying exhaust from an engine wherein the SCR system comprises a pressurizing device for feeding reducing agent from a container to a dosing unit arranged to dose the reducing agent under pressure to an exhaust duct, wherein the method comprises the step of reducing, during periods of non-continuous dosing of reducing agent during the operation of the pressurizing device, the pressure of the reducing agent at the dosing unit compared to the pressure during continuous dosing.

According to one aspect of the invention, the pressurizing device can feed reducing agent from a container to the dosing unit and thereby pressurize the reducing agent to a suitable pressure, e.g. a pressure between 5 and 15 bars, e.g. 9 bars, during dosing of the reducing agent to the exhaust duct. During periods of non-continuous dosing of the reducing agent, the pressure of the reducing agent can be lowered from a higher pressure level (when dosing is occurring continuously) to a lower pressure level, e.g. a pressure level between 1 and 6 bars, such as 2 bars or 5 bars. According to one example, the pressure of the reducing agent can be reduced from a pressure level of, e.g. 50 bars, when dosing is occurring to a pressure level of, e.g. 5 bars, when continuous dosing is not occurring.

Reducing the pressure of the reducing agent in the dosing unit lowers the risk of reducing agent leakage during periods of non-dosing of the reducing agent. A leakage of reducing agent can affect the function of the SCR system negatively, which can result in undesired exhaust being emitted from an aftertreatment system of the vehicle. Leakage of reducing agent can cause, for example, deposits in the dosing unit, which can affect a spray pattern of dosed reducing agent. This can cause a striking surface of the exhaust duct and/or drop sizes of reducing agent to be affected negatively. In certain cases this can cause a plurality of deposits and crystallizations of the reducing agent in the exhaust system, which can affect the function of the SCR system negatively.

Because the pressurizing device is still in operation during non-dosing as well, the pressure can be restored more quickly to a level at which dosing of the reducing agent occurs compared to a method in which the pressurizing device is shut off entirely. Moreover, advantageous cooling of the dosing unit by means of the reducing agent flow around same can be maintained.

A period of non-continuous dosing of reducing agent can last for a given predetermined time, which is adjustable. An example of a time interval within the adjustable predetermined time can be between 1 s and 60 s, although other predetermined periods are also possible.

A period of non-continuous dosing of reducing agent can include a given determined number of strokes when dosing does not occur.

According to one aspect of the invention, the pressure of the reducing agent at the dosing unit can be reduced from a first higher pressure level to a lower second pressure level after a predetermined period of non-dosing and then back to the first higher pressure level or another suitable higher pressure level after a predetermined period of dosing.

According to one embodiment, a pressure of the reducing agent at the dosing unit can be increased from the lower pressure level to higher pressure level in connection with an identified dosing request. Dosing of reducing agent can thus be resumed (started) when the pressure of the reducing agent reaches the higher pressure level.

According to one aspect of the invention, the pressure of the reducing agent in the dosing unit can be reduced at a given predetermined pressure reduction rate.

According to one aspect of the invention, a period of non-continuous dosing can occur depending on the operating status of the engine. One operating status in which continuous dosing does not occur can be when the exhaust from the engine is at a temperature that is below a given predetermined temperature. Another operating status in which continuous dosing does not occur can be when the engine is idling. There are also other operating statuses in which continuous dosing of reducing agent does not occur. The method according to the invention can be used in a number of operating cases in which continuous dosing does not occur. One such case is when the vehicle has applied an engine breaking function, e.g. during forward travel on a downhill stretch.

According to one aspect of the present invention, the pressure of the reducing agent during periods of non-continuous dosing can be reduced only when certain criteria are met. These criteria can be, for example, one or more of the following:

the temperature of the exhaust is below a given predetermined value;
deposits have been detected in the exhaust system; and/or
leakage of the reducing agent has been detected in the dosing unit.

The deposits and leakage can be determined in a suitable manner. According to this aspect, and only in those cases where one or a plurality of the foregoing criteria are met, the pressure is reduced during periods of non-dosing of reducing agent.

Maintained operation of the pressurizing device entails that the pressurizing device is in operation, i.e. it is not shut off.

The pressurizing device can, for example, comprise a pump, such as a membrane pump.

The method can comprise the step of:
reducing the pressure of the reducing agent at the dosing unit by reducing the rpm of the pressurizing device. This provides an efficient means of reducing the pressure in a suitable manner. The pressurizing device can thus be controlled to change the pressure relatively rapidly.

According to one aspect of the invention, the pressurizing device is a pump whose rpm can be adjusted to reduce its output and thereby reduce the pressure of the reducing agent in the dosing unit.

The method can comprise the step of:
reducing the pressure of the reducing agent at the dosing unit by reducing a stroke rate of the pressurizing device. An efficient means of reducing the pressure is achieved thereby. Said pressurizing device can thus be controlled to change the pressure relatively quickly.

According to one aspect of the invention, the pressurizing device is a pump whose rpm can be adjusted to reduce its output and thereby reduce the pressure of the reducing agent at the dosing unit.

The method can comprise the step of:
reducing the pressure of the reducing agent at the dosing unit by reducing a stroke rate of the pressurizing device. An efficient means of reducing the pressure is achieved thereby. The pressurizing device can thus be controlled to change the pressure relatively quickly.

The method can comprise the step of
reducing the pressure of the reducing agent at the dosing unit by controlling a valve configuration on a downstream side of the dosing unit. An efficient means of reducing the pressure is achieved thereby. The pressurizing device can thus be controlled to change the pressure relatively quickly. By increasing a throughflow of reducing agent at the valve configuration, the pressure of the reducing agent at the dosing unit can be reduced in an efficient manner.

According to one aspect of the invention, the pressure of the reducing agent at the dosing unit is reduced by fully opening the valve configuration disposed downstream of the dosing unit. At normal pressure, such as during continuous dosing of reducing agent, the valve configuration can be closed, or it can only be open to a certain extent. In connection with a reduction of the reducing agent pressure, such as during non-continuous dosing of reducing agent, the valve configuration can be opened more and the reducing agent can pass more easily through the valve configuration, which will result in a reduction in the pressure of the reducing agent at the dosing unit.

In the case of a pressurizing device with a controllable displacement, the control of a pressure of the reducing agent at the dosing unit can be achieved while maintaining rpm, i.e. the pressure changes can, according to one embodiment, be achieved without changing the rpm of the pressurizing device.

The method can comprise the step of:
reducing the pressure of the reducing agent at the dosing unit by conducting the reducing agent from the pressurizing device to the container to bypass the dosing unit.

According to one aspect, the reducing agent can, when the pressure is to be reduced, be led from the pressurizing device to the container to bypass the dosing unit. A valve configuration consisting of one or a plurality of valves can, for example, control the flow of reducing agent, either to the dosing unit or to bypass the dosing unit. The first control unit can be arranged to control the valve configuration in accordance with the present invention.

The method can comprise the step of:
reducing the pressure of the reducing agent at the dosing unit by controlling a feeding device arranged downstream of the dosing unit.

Placing a feeding device downstream of the dosing unit makes it possible for the pressure of the reducing agent to be reduced, in that the feeding device lowers the pressure downstream of the dosing unit. The feeding device can be, for example, a pump such as a membrane pump or another type of pump.

The method can comprise the step of:
reducing the pressure of the reducing agent at the dosing unit significantly.

The pressure can be, for example, reduced from a level of 9 bars to a level of 2 bars. Alternatively, the pressure can be reduced from a level of 9 bars to a level of 5 bars. Reducing the pressure significantly can mean that the pressure is reduced by at least 40% relative to the pressure of the reducing agent during continuous dosing. Reducing the pressure significantly can mean that the pressure is reduced by at least 20% relative to the pressure of the reducing agent during continuous dosing. Reducing the pressure of the reducing agent in the dosing unit significantly can mean reducing the pressure by more than 80% relative to the pressure of the reducing agent during continuous dosing.

The method can comprise a stepless reduction of the pressure. This stepless reduction in the pressure of the reducing agent can be achieved by means of any of the components that reduce the pressure, such as:
the pressurizing device;
a valve configuration downstream of the dosing unit;
at least one valve configuration that conducts reducing agent to bypass the dosing unit.

The stepless reduction can occur with varying speed. The speed can vary depending on different parameters, such as engine type etc, and it can also vary during an ongoing reduction in the pressure of the reducing agent.

The method can comprise a stepwise reduction in the pressure of the reducing agent.

This stepwise reduction in the pressure of the reducing agent can be achieved by means of any of the components that can produce a reduction in the pressure, such as:
the pressurizing device;
a valve configuration downstream of the dosing unit;
at least one valve configuration that conducts reducing agent to bypass the dosing unit.

The pressure of the reducing agent can be reduced in an arbitrary number of steps.

The method can comprise the step of:
increasing the pressure of the reducing agent at the dosing unit during resumed continuous dosing.

The method can comprise the step of:
increasing the pressure of the reducing agent at the dosing unit before the continuous dosing is resumed or started.

The method can comprise the step of:
increasing the pressure of the reducing agent at the dosing unit before the continuous dosing is resumed or started on the basis of an identified dosing request.

After a period of non-dosing of the reducing agent, the reducing agent can again be dosed. The pressure of the reducing agent at the dosing unit is thus increased again to a suitable pressure level that has been set for dosing the reducing agent.

The method can comprise the step of:
initiating a pressure reduction of the reducing agent at the dosing unit at a predetermined time before an identified time when continuous dosing of reducing agent is to cease.

In order for the pressure of the reducing agent to be at a low level when the dosing unit is closed, the pressure reduction can, according to one exemplary embodiment, be initiated a predetermined time before an identified time when the dosing of reducing agent is to cease.

The method is easy to implement in existing motor vehicles. Program code for controlling a pressure reduction at a dosing unit in an SCR system to prevent leakage of reducing agent when the dosing unit is closed can, according to one aspect of the invention, be installed in a control unit in the vehicle during its manufacture. A buyer of the vehicle can thus be given opportunity to choose the function of the method as an option. Alternatively, program code for performing the innovative method can be installed in a control unit in the vehicle during an upgrade at a service station. In this case the program code is downloaded into a memory in the control unit.

Program code for reducing the pressure of a reducing agent at a dosing unit in an SCR system to prevent leakage of reducing agent when the dosing unit is closed can easily be updated or replaced. Furthermore, different parts of the program code can be replaced independent of one another. This modular configuration is advantageous from a maintenance perspective.

According to one aspect of the present invention, an SCR system is provided that is arranged to dose reducing agent into the exhaust duct of an engine upstream of an SCR catalytic converter for reducing the $NO_x$ level in an exhaust flow from the engine, wherein the SCR system comprises:
a dosing unit adapted to dose the reducing agent to the exhaust duct under pressure;
a pressurizing device adapted to feed reducing agent from a container to the dosing unit;

devices adapted to reduce, during periods of non-continuous dosing of reducing agent during continued maintained operation of the pressurizing device, the pressure of the reducing agent at the dosing unit compared to the pressure during continuous dosing.

According to one aspect of the invention, an SCR system is provided wherein the pressurizing device comprises a pump with controllable rpm. According to one aspect of the invention, an SCR system is provided wherein the pressurizing device comprises a pump with a controllable stroke rate. The device can comprise a valve configuration disposed on a downstream side of the dosing unit. The device can comprise devices for lowering the pressure of the reducing agent significantly. The device can comprise devices for lowering the pressure of the reducing agent steplessly. The device can comprise devices for lowering the pressure of the reducing agent stepwise. The device can comprise devices for leading the reducing agent from the pressurizing device to the container to bypass the dosing unit. The device can comprise a feeding device arranged downstream of the dosing unit.

The foregoing objects are also achieved by means of a motor vehicle that contains the SCR system according to the invention. The motor vehicle can be a truck, bus or car.

According to one aspect of the invention, a computer program is provided for lowering the pressure of a reducing agent at a dosing unit in an SCR system in order to prevent reducing agent leakage when the dosing unit is closed, wherein the computer program contains program code for causing an electronic control unit or another computer connected to the electronic control unit to perform the steps according to the method disclosed herein.

According to one aspect of the invention, a computer program is provided for lowering the pressure of a reducing agent at a dosing unit in an SCR system in order to prevent reducing agent leakage when the dosing unit is closed, wherein the computer program contains program code stored on a computer-readable medium in order to cause an electronic control unit or another computer connected to the electronic control unit to perform the steps according to the method disclosed herein.

According to one aspect of the invention, a computer program is provided for an SCR system, wherein the computer program contains program code for causing an electronic control unit or another computer connected to the electronic control unit to perform the steps according to the method disclosed herein.

According to one aspect of the invention, a computer program is provided for an SCR system, wherein the computer program contains program code stored on a computer-readable medium in order to cause an electronic control unit or another computer connected to the electronic control unit to perform the steps according to the method disclosed herein.

According to one aspect of the invention, a computer program product is provided containing a program code stored on a computer-readable medium for performing the method steps according to the method disclosed herein when the program code is run on an electronic control unit or another computer connected to the electronic control unit.

Additional objects, advantages and new features of the present invention will be apparent to one skilled in the art from the following details, and through the exercise of the invention. While the invention is described below, it should be apparent that the invention is not limited to the specific described details. Those skilled in the art who have access to the teaching herein will recognize additional applications, modifications and implementations in other areas, which are within the scope of the invention.

BRIEF DESCRIPTION OF THE DRAWINGS

For a more complete understanding of the prevent invention and additional objects and advantages thereof, reference is now made to the following detailed description, which is to be read together with the accompanying drawings, in which the same reference designations pertain to the same parts in the various figures, and in which.

DETAILED DESCRIPTION OF THE FIGURES

Figure 1:
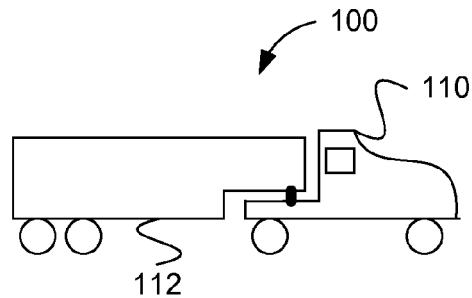
FIG. 1 schematically illustrates a vehicle according to one embodiment of the invention.

A side view of a vehicle 100 is shown with reference to FIG. 1. The exemplary vehicle 100 comprises a tractor 110 and a trailer 112. The vehicle can be a heavy vehicle, such as a truck or a bus. The vehicle can alternatively be a car. The vehicle can alternatively be a forklift truck, dumper or crane, or another suitable platform comprising an engine and an SCR system.

It should be noted that the invention is suitable for application in any arbitrary suitable SCR system comprising a dosing unit for reducing agent and an SCR catalytic converter, and thus is not limited to SCR systems in motor vehicles. The innovative method for an SCR system and the innovative SCR system according to one aspect of the invention are well suited for platforms other than motor vehicles that include an SCR system, such as watercraft. The watercraft can be of any arbitrary suitable type, such as motorboats, boats, vessels or ships.

According to one aspect of the invention, the innovative method and the innovative SCR system are also well suited for, for example, systems that include, for example, a stone crusher or the like.

According to one aspect of the invention, the innovative method and the innovative SCR system are well suited for, for example, systems that include industrial motors and/or motorized industrial robots.

According to one aspect of the invention, the innovative method and the innovative SCR system are also well suited for various types of power plants, such as electrical power plants that include a diesel generator.

The innovative method and the innovative SCR system are well suited for any arbitrary suitable engine system that includes an engine and an SCR system with a dosing unit and a SCR catalytic converter, such as a locomotive or other platform.

The innovative method and the innovative SCR system are well suited for any arbitrary suitable system that includes a $NO_x$ generator and an SCR system with a dosing unit and a SCR catalytic converter.

The term "link" refers herein to a communications link, which can be a physical line, such as an opto-electronic communication line, or a non-physical line, such as a wireless connection, for example a radio or microwave link.

The term "line" refers herein to a passage for containing and transporting a fluid, such as a reductant in liquid form. The line can be a tube of any arbitrary dimension. The line can consist of any arbitrary suitable material, such as plastic, rubber or metal.

The term "reductant" or "reducing agent" or "reducer" refers herein to an agent that is used to react with certain emissions in an SCR system. These emissions can be, for example, $NO_x$ gas. The terms "reductant" and "reducing agent" and "reducer" are used herein synonymously. According to one embodiment, the reductant is so-called AdBlue. Naturally, other types of reductants can be used. AdBlue is cited herein as an example of a reductant, but one skilled in the art will perceive that the innovative method and the innovative device can be realized for other types of reductants. The reducing agent can contain a suitable urea solution. The urea solution can contain a suitable concentration of urea.

Figure 2A:
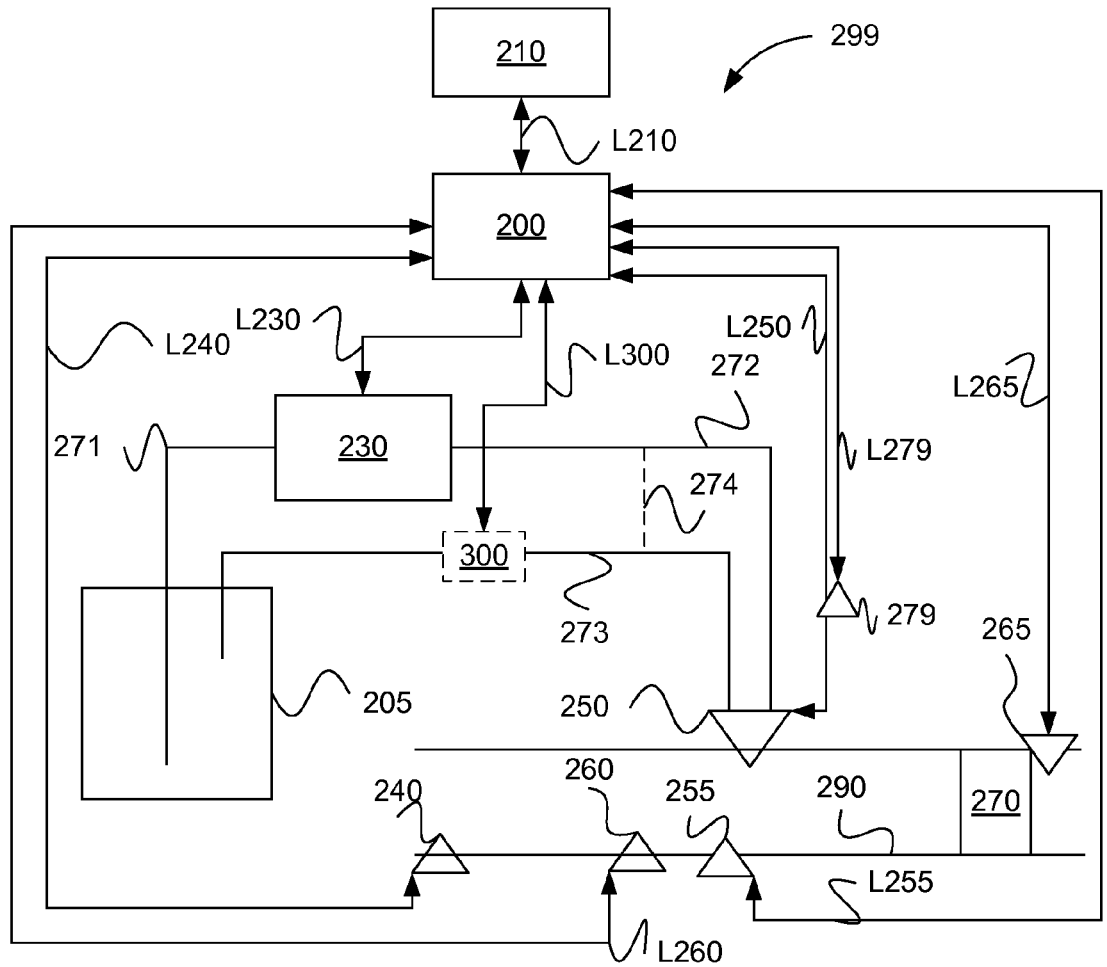
FIG. 2a schematically illustrates an SCR system according to one embodiment of the invention.

An SCR system 299 in the vehicle 100 is shown with reference to FIG. 2a. The SCR system 299 can be disposed in the tractor 110. The SCR system 299 according to this example comprises a container 205 that is arranged to contain a reductant. The container 205 is arranged to contain a suitable amount of reductant, and is further arranged to be able to be filled as needed.

A first line 271 is arranged to conduct the reductant from the container 205 to a pump 230. The pump 230 can also be referred to as a pressurizing device. The pump 230 can be a suitable pump. The pump 230 can be a membrane pump containing at least one filter. The pump 230 can be arranged to be driven by an electric motor (not shown). The pump 230 can be arranged to pump the reductant from the container 205 via the first line 271 and to supply the reductant to a dosing unit 250 via a second line 272. The dosing unit 250 can comprise an electrically controlled dosing device which can control a flow of reductant added to the exhaust system. The pump 230 is arranged to pressurize the reductant in the second line 272. The dosing unit 250 is arranged with a throttling unit, which can also be referred to as a throttle valve, against which the pressure of the reductant can build up in the device 299. The throttle valve is described in greater detail with reference to FIG. 2b.

The dosing unit 250 is arranged to supply the reductant to an exhaust duct 290 in the vehicle 100. More specifically, the dosing unit 250 in arranged to supply a suitable amount of reductant to an exhaust duct 290 in the vehicle 100 in a controlled manner. According to this embodiment, an SCR catalytic converter 270 is arranged downstream of a location in the exhaust system where the supply of reductant occurs. The quantity of reductant that is supplied to the exhaust system is intended to be used in the SCR catalytic converter to reduce the amount of undesired emissions.

The dosing unit 250 can be disposed in the exhaust duct 290, which is arranged to lead exhaust from a combustion engine (not shown) in the vehicle 100 on to the SCR catalytic converter 270 and on to the surroundings of the vehicle.

A third line 273 is pre-existingly disposed between the dosing unit 250 and the container 205. The third line 273 is arranged to lead un-dosed reductant that has been fed to the dosing unit 250 back to the container 205.

According to one embodiment, a fourth line 274 arranged to lead the reductant between the pump 230 and the container 205 to bypass the dosing unit 250 can be included in the SCR system. The first control unit 200 can be signal-connected to a valve configuration (not shown) in the fourth line 274. The first control unit 200 can thus be adapted to control the conducting of the reductant from the pump 230 or the second line 272 directly to the container 205 without the reductant passing through the dosing unit 205. According to one aspect of the invention, the pressure at the dosing unit 250 can thereby be reduced in a suitable manner.

The first control unit 200 is arranged for communication with the pump 230 via a link L230. The first control unit 200 is arranged to control the operation of the pump 230. According to one example, the first control unit 200 is arranged to control the pump 230 by means of an electric motor (not shown). The first control unit 200 is arranged to control a pressure P of the reductant in the second line 272. This can occur in various suitable ways. According to one example, the first control unit 200 is arranged to control a prevailing rpm of the pump 230. The pressure can be altered thereby in a desirable manner. The pressure P can be increased by increasing the rpm of the pump 230. The pressure P can be reduced by reducing the rpm of the pump 230. According to another example, the first control unit 200 is arranged to change a stroke length of the pump 230. The pressure P can be increased by increasing the stroke length of the pump 230. The pressure P can be reduced by reducing the stroke length of the pump. According to another example, the first control unit 200 is arranged to change a stroke rate of the pump 230. The pressure P can be increased by increasing the stroke rate of the pump 230. The pressure P can be reduced by reducing the stroke rate of the pump 230.

According to one embodiment, a second pump 300 can be included in the SCR system. The second pump 300 can also be referred to as a feeding device or feeder device. The first control unit 200 is arranged for communication with the pump 300 via a link L300. The first control unit 200 is arranged to control the operation of the pump 300. According to one example, the first control unit 200 is arranged to control the pump 300 by means of an electric motor (not shown). The pressure of the reductant in the line 272 can be reduced by controlling the pump 300 to reduce the pressure of the reductant on an upstream side of the pump 300.

The first control unit 200 is arranged for communication with the dosing unit 250 and the throttling unit, which can be included in the dosing unit 250. The pressure in the line 272 can be controlled by controlling the throttling unit. The pressure P in the line 272 can be increased by decreasing the opening in the throttling unit, and the pressure P in the line 272 can be reduced by enlarging the opening in the throttling unit.

The first control unit 200 is arranged to reduce, during periods of non-continuous dosing of reductant during continuing maintained operation of the pressurizing device 230, the pressure of the reductant at the dosing unit 250 compared to the pressure during continuous dosing. The first control unit 200 is arranged to reduce the pressure of the reductant at the dosing unit 250 by reducing the rpm of the pressurizing device 230. The first control unit 200 is arranged to reduce the pressure of the reductant at the dosing unit 250 by reducing the stroke rate of the pressurizing device 230. The first control unit 200 is arranged to reduce the pressure of the reductant at the dosing unit 250 by controlling a valve configuration (not shown) on a downstream side of the dosing unit 250.

The first control unit 200 is arranged to reduce the pressure of the reducing agent at the dosing unit 250 by controlling the leading of the reducing agent from the pressurizing device 230 to the container 205 to bypass the dosing unit 250. The reducing agent is conducted to bypass the dosing unit via line 274.

The first control unit 200 is arranged to reduce the pressure of the reducing agent at the dosing unit 250 by controlling a feeding device 300 arranged downstream of the dosing unit 250. The first control unit 200 is arranged to reduce the pressure of the reducing agent at the dosing unit significantly. The first control unit 200 is arranged to reduce the pressure of the reducing agent steplessly. The first control unit 200 is arranged to reduce the pressure of reducing agent stepwise. The first control unit 200 can be arranged to increase the pressure of the reducing agent at the dosing unit 250 in connection with resumed continuous dosing. The first control unit 200 can be arranged to increase the pressure of the reducing agent at the dosing unit 250 to a suitable level before continuous dosing is begun. The first control unit 200 can be arranged to increase the pressure of the reducing agent at the dosing unit 250 to a suitable level before continuous dosing is begun on the basis of a dosing request. The request can be determined by a suitable system in, for example, the vehicle 100. The first control unit 200 is arranged to begin to reduce the pressure of the reducing agent in the dosing unit 250 at a predetermined time prior to a set point in time at which continuous dosing of reducing agent is to cease.

The first control unit 200 is arranged for communication with the dosing unit 250 via a link L250. The first control unit 200 is arranged to control the operation of the dosing unit 250 in order to, for example, regulate the supply of the reductant to the exhaust system of the vehicle 100.

A second control unit 210 is arranged for communication with the first control unit 200 via a link L210. The second control unit 210 can be removably connected to the first control unit 200. The second control unit 210 can be a control unit external to the vehicle 100. The second control unit 210 can be arranged to perform the inventive method steps according to the invention. The second control unit 210 can be used to load program code to the first control unit 200, particularly program code for performing the inventive method. The second control unit 210 can alternatively be arranged for communication with the first control unit 200 via an internal network in the vehicle. The second control unit 210 can be arranged to perform essentially the same functions as the first control unit 200, such as e.g. reducing, during non-continuous dosing of reducing agent in the SCR system during continued maintained operation of the pressurizing devices, the pressure of the reducing agent at the dosing unit compared to the pressure during continuous dosing.

The first control unit 200 is arranged for communication with a first temperature sensor 240 via a link L240. The temperature sensor 240 is arranged to detect a prevailing temperature T1 of an exhaust stream from the vehicle engine. According to one example, the first temperature sensor 240 is disposed in the exhaust duct 290 directly downstream of the upstream dosing unit 250 of the vehicle.

The temperature sensor 240 can be pre-existingly arranged in a suitable location in the exhaust duct 290. The first temperature sensor 240 is arranged to continuously detect a prevailing temperature Temp1 of the exhaust stream and send signals containing information about the prevailing temperature Temp1 via the link L240 to the first control unit 200.

The first control unit 200 is arranged for communication with a second temperature sensor 260 via a link L260. The second temperature sensor 260 can be arranged to detect a prevailing temperature Temp2 of a surface in the exhaust system where reducing agent is being vaporized. The second temperature sensor 260 can be arranged so as to detect a prevailing temperature Temp2 of the exhaust duct 290 in a suitable location. The second temperature sensor 260 can be arranged so as to detect a prevailing temperature Temp2 of a suitable surface or component of the exhaust duct 290. According to one example, the second temperature sensor 260 is disposed in the exhaust duct 290 upstream of the dosing unit 250. According to a second example, the second temperature sensor 260 is arranged in a vaporizing unit (not shown) or the SCR catalytic converter downstream of the dosing unit 250. The second temperature sensor 260 is arranged so as to continuously detect a prevailing temperature Temp2 of a surface or a component or the exhaust duct 290 and send signals containing information about the prevailing temperature Temp2 via the link L260 to the first control unit 200.

According to one embodiment, the first control unit 200 and/or the second control unit 210 is/are arranged to calculate the first temperature Temp1. This can occur by means of a stored calculation model. The first control unit 200 and/or the second control unit 210 can be arranged to calculate the first temperature Temp1 on the basis of, for example, the prevailing exhaust mass flow, prevailing engine rpm and prevailing engine load.

According to one embodiment, the first control unit 200 and/or the second control unit 210 is/are arranged to calculate the second temperature Temp2. This can occur by means of a stored calculation model. The first control unit 200 and/or the second control unit 210 can be arranged to calculate the second temperature Temp2 on the basis of, for example, the prevailing exhaust mass flow, prevailing engine rpm and prevailing engine load.

A first $NO_x$ sensor 255 is arranged for communication with the first control unit 200 via a link L255. The first $NO_x$ sensor 255 is arranged to continuously determine the prevailing $NO_x$ level in the exhaust stream upstream of the SCR catalytic converter 270. According to one example, the first $NO_x$ sensor 255 is arranged in the exhaust duct 290 upstream of the dosing unit 250. The first $NO_x$ sensor 255 is arranged to continuously send signals containing information about the prevailing $NO_x$ level upstream of the SCR catalytic converter to the first control unit 200.

A second $NO_x$ sensor 265 is arranged for communication with the first control unit 200 via a link L265. The second $NO_x$ sensor 265 is arranged to continuously determine the prevailing $NO_x$ level in the exhaust stream downstream of the SCR catalytic converter 270. The second $NO_x$ sensor 265 is arranged to continuously send signals containing information about the prevailing $NO_x$ level downstream of the SCR catalytic converter 270 to the first control unit 200.

According to one embodiment, the first control unit 200 and/or the second control unit 210 is/are arranged to calculate the first $NO_x$ level upstream of the SCR catalytic converter 270. This can occur by means of a stored calculation model. The first control unit 200 and/or the second control unit 210 can be arranged to calculate the first $NO_x$ level on the basis of, for example, a prevailing exhaust mass flow, prevailing engine rpm and prevailing engine load.

The first control unit 200 is arranged to determine the prevailing $NO_x$ conversion rate on the basis of the calculated or measured $NO_x$ level upstream of the SCR catalytic converter and the measured $NO_x$ level downstream of the SCR catalytic converter 270.

The first control unit 200 is arranged to continuously control the operation of the SCR system 299 on the basis of the first temperature Temp1 and/or the second temperature Temp2.

The first control unit 200 is arranged for communication with a pressure sensor 279 via a link L279. The pressure sensor 279 is arranged to detect a prevailing pressure P of the reducing agent in the second line 272. According to one example, the pressure sensor 271 is arranged in the dosing unit 250 to detect a pressure P of the reducing agent in the dosing unit 250. The pressure sensor 271 can be pre-existingly disposed in a suitable location so as to measure the pressure of the reducing agent in the dosing unit 250. The pressure sensor 271 is arranged so as to continuously detect a prevailing pressure P of the reducing agent and send signals containing information about the prevailing pressure P via the link L271 to the first control unit 200.

According to one embodiment, the first control unit 200 and/or the second control unit 210 is/are arranged to calculate the pressure P of the reducing agent at the dosing unit 250. This can occur by means of a stored calculation model. The first control unit 200 and/or the second control unit 210 can be arranged to calculate the pressure P on the basis of, for example, a prevailing rpm of the pump 230 and/or setting of the valve configuration 288 and/or the rpm of the pump 300 and/or settlings of valve devices in the fourth line 274.

The first control unit 200 is arranged to continuously control the operation of the SCR system 299 on the basis of the $NO_x$ level upstream of the SCR catalytic converter 290 and/or the $NO_x$ level downstream of the SCR catalytic converter 270.

The first control unit 200 is arranged to continuously control the operation of the SCR system 299 on the basis of the pressure P.

Figure 2B:
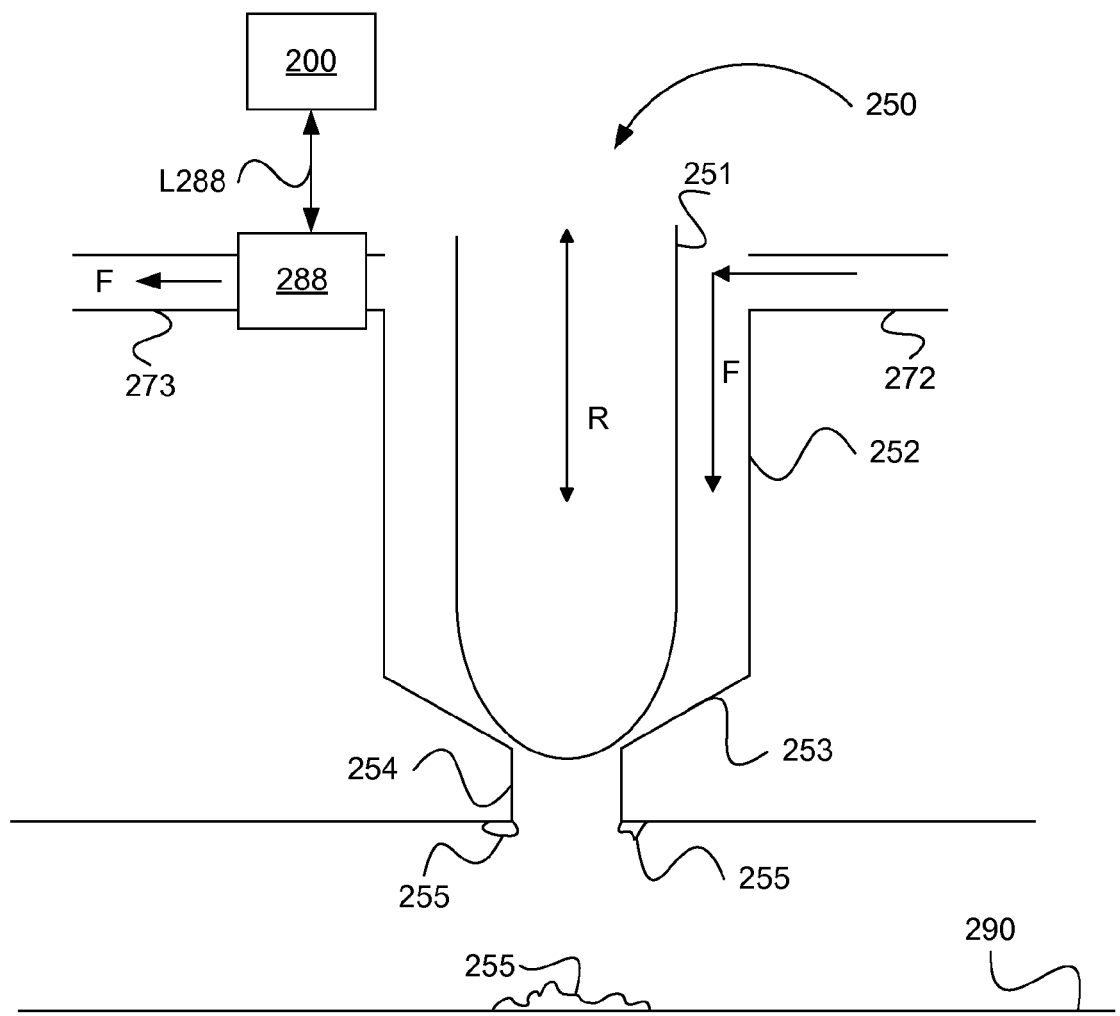
FIG. 2b schematically illustrates a dosing unit in the SCR system.

FIG. 2b schematically depicts the dosing unit 250. The dosing unit 250 comprises a wall 252 with a seat 253 and a longitudinal apparatus 251. The apparatus 251 can be a pin or a needle. The apparatus 251 is arranged displaceably. The apparatus 251 is arranged to be displaced by means of suitable equipment, such as electromagnetic equipment, in a to-and-fro motion as indicated in FIG. 2b in the form of a bidirectional arrow R. The apparatus 251 is displaceably arranged between two end positions. At a first end position, which is shown in FIG. 2b, one end of the apparatus is essentially in abutment against a seat 253, whereupon the dosing unit 250 is closed and no dosing will occur. At a second end position, the one end of the apparatus is not in abutment against the seat 253, whereupon the dosing unit 250 is open and dosing can occur.

Reducing agent is arranged to be conducted to the dosing unit 250 under pressure via the line 272. During the dosing of reducing agent, the apparatus is moved in an upward motion, with the result that reducing agent can pass out through a passage 254 to the exhaust duct 290. During continuous dosing, the apparatus 251 can be kept in the second end position for a predetermined period of time at a given rate, so that reducing agent can be dosed into the exhaust duct 290, and the apparatus 251 can be kept in the first end position, and thus lie in abutment against the seat reducing agent is not dosed into the exhaust duct 290 for a determined period of time at a given rate.

Even though the apparatus 251 is located in the first end position, lying in abutment to the seat 253, a degree of leakage can occur between the apparatus 251 and the seat 253, particularly at a relatively high pressure P of the reducing agent in the dosing unit 250. The method according to the invention, wherein the pressure of the reducing agent is reduced when dosing is not to occur, thus advantageously reduces the leakage.

Reducing agent is thus supplied to the dosing unit 250 via the passage 272. Reducing agent that is not dosed is thus fed from the dosing unit 250 to the container 205 via the line 273. A direction of flow for the non-dosed reducing agent is indicated by arrows F in FIG. 2b.

Undesired reducing agent crystals 255, which have arisen due to the undesired leakage of reducing agent in the dosing unit 250, are illustrated in FIG. 2b. These reducing agent crystals can thus be avoided by using the method according to the invention. The reducing agent crystals 255 are illustrated solely to indicate especially vulnerable locations for crystallization of reducing agent in connection with undesired leakage, namely around an opening of the passage 254 and in a lower part of the exhaust duct 290. Deposits and/or crystal formation in the passage are naturally also disadvantageous for various reasons.

The first control unit 200 is arranged for communication with a valve configuration 288 via a link L288. The first control unit 200 is arranged to control the valve configuration 288, and can thus set a degree of opening of the valve configuration 288. By adjusting the valve configuration 288 to an at least partly open position, the pressure P of the reducing agent at the dosing unit 250 can be reduced, according to one aspect of the present invention. By adjusting the valve configuration 288 to an at least partly open position at the same time as the pressurizing device 230 controls a pressure reduction of the reducing agent, the pressure P of the reducing agent at the dosing unit 250 can advantageously be reduced relatively quickly. According to one aspect of the present invention, advantageous synergistic effects can be achieved hereby. It should be noted that the pressure of the reducing agent in the dosing unit 250 can be increased by adjusting the valve configuration toward a closed position.

The dosing unit 250 can be designed according to the alternative embodiments. The control of dosing by means of the apparatus 251 is only on exemplary embodiment. Other design configurations are feasible. According to one example, a displaceable plate that covers the passage 254 can be arranged for dosing reducing agent in a similar manner.

Figure 3A:
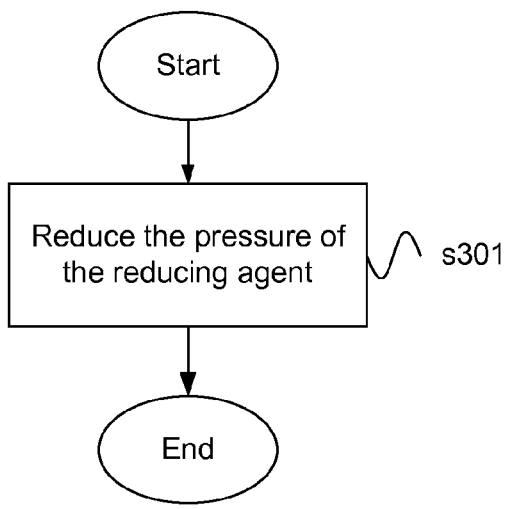
FIG. 3a schematically illustrates a flow diagram for a method according to one embodiment of the invention.

FIG. 3a schematically illustrates a flow diagram of a method for an SCR system comprising a dosing unit 250 for dosing reducing agent into an engine exhaust duct 290 upstream of a SCR catalytic converter 270 for reducing the $NO_x$ level in an exhaust flow from the engine, wherein the SCR system contains a pressurizing device for feeding reducing agent from a container to the dosing unit 250 arranged to dose the reducing agent to the exhaust duct 290 under pressure. The method comprises a first method step s301. The method step s301 comprises the step of:

reducing, during periods of non-continuous dosing of reducing agent during continued maintained operation of the pressurizing device 230, the pressure of the reducing agent at the dosing unit compared to the pressure during continuous dosing.

The method is ended after the step s301.

Figure 3B:
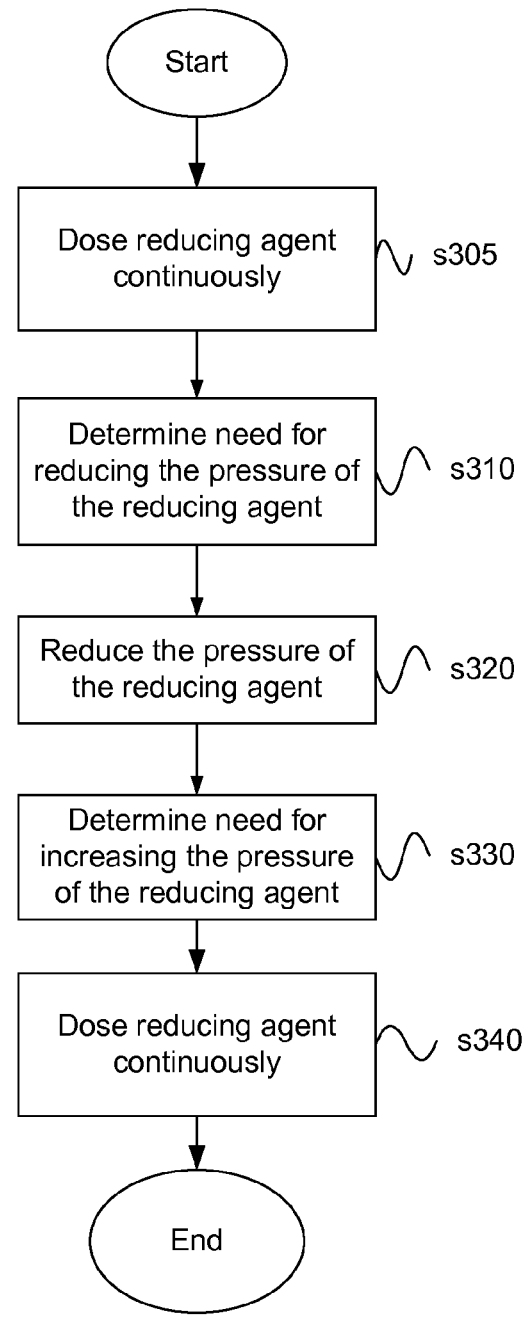
FIG. 3b schematically illustrates, in greater detail, a flow diagram for a method according to one aspect of the invention.

FIG. 3b schematically illustrates a flow diagram for a method for an SCR system comprising a dosing unit 250 for dosing reducing agent into an engine exhaust duct 290 upstream of a SCR catalytic converter 270 for reducing the $NO_x$ level in an exhaust flow from the engine, wherein the SCR system comprises a pressurizing device 230 for feeding reducing agent from a container to the dosing unit 250 arranged to dose the reducing agent under pressure to the exhaust duct 290, according to one aspect of the present invention.

The method comprises a method step s305. The method step s305 includes the step of continuously dosing reducing agent by means of the dosing unit 250 to the exhaust duct 209. Dosing can thus occur at a pressure P1, e.g. 9 bars. A subsequent step s310 is performed after the method step s305.

The method step s310 can include activating the method according to the invention. The activation can occur automatically. The activation can occur when the first control unit 200 determines that the continuous dosing of reducing agent is to be discontinued. The activation can alternatively occur when the first control unit 200 determines that the continuous dosing of reducing agent has been discontinued.

The method step s310 can include the step of determining a need for reducing the pressure of the reducing agent. The need to reduce the pressure of the reducing agent can be determined by including one or a plurality of the following steps:

checking the operating status of the engine;
registering the time that has elapsed since the start of non-continuous dosing;
detecting a prevailing exhaust temperature and/or temperature of a suitable surface or component of the exhaust duct 290;
detecting a prevailing gas flow; and
detecting deposits or crystals of reducing agent.

A subsequent method step s320 is performed after the method step s310.

The method step s320 comprises the step of reducing the pressure P of the reducing agent under predetermined operating conditions of the SCR system. The reduction can comprise a reduction from a pressure P1 to a pressure P2, according to what is described with reference to, for example, FIGS. 4a-4d. The predetermined operating conditions can consist in that the dosing of reducing agent is to cease or has ceased. The operating conditions can be determined on the basis of the steps as exemplified in method step s310, for example through comparison with criteria stored in the first control unit 200. The step s320 can include reducing the pressure by:

reducing a prevailing rpm of the pressurizing device 230;
reducing a stroke rate of the pressurizing device 230; or
controlling a valve configuration 288 on a downstream side of the dosing unit 250; and/or
conducting reducing agent from the pressurizing device 230 to the container 205 to bypass the dosing unit 250; and/or
controlling an additional pressurizing device 300 arranged downstream of the dosing unit 250.

The method step s320 can comprise the step of reducing the pressure of the reducing agent significantly. The method step s320 can comprise the step of reducing the pressure of the reducing agent steplessly. The method step s320 can alternatively comprise the step of reducing the pressure of the reducing agent stepwise.

A subsequent method step s330 is performed after the method step s320.

The method step s330 can comprise the step of determining the need to increase the pressure of the reducing agent. In connection with resumed dosing of the reducing agent, the pressure of the reducing agent in line 272 at the dosing unit 250 must be re-increased in order to achieve correct dosing of reducing agent in the exhaust duct. Alternatively, the need can be determined based on a request to start continuous dosing of reducing agent. A subsequent step s340 is performed after the step s330.

The method step s340 comprises, assuming a determined need, starting the dosing of reducing agent from the dosing unit 250 to the exhaust duct 290 and thus again increasing the pressure P in a suitable manner, e.g. from a pressure P2 to a pressure P1. Alternatively, the pressure P can be increased in a suitable manner, e.g. from a pressure P2 to a pressure P1, after which dosing of reducing agent from the dosing unit 250 to the exhaust duct 290 is started. The method according to the invention is concluded after the method step s340.

Figure 4A:
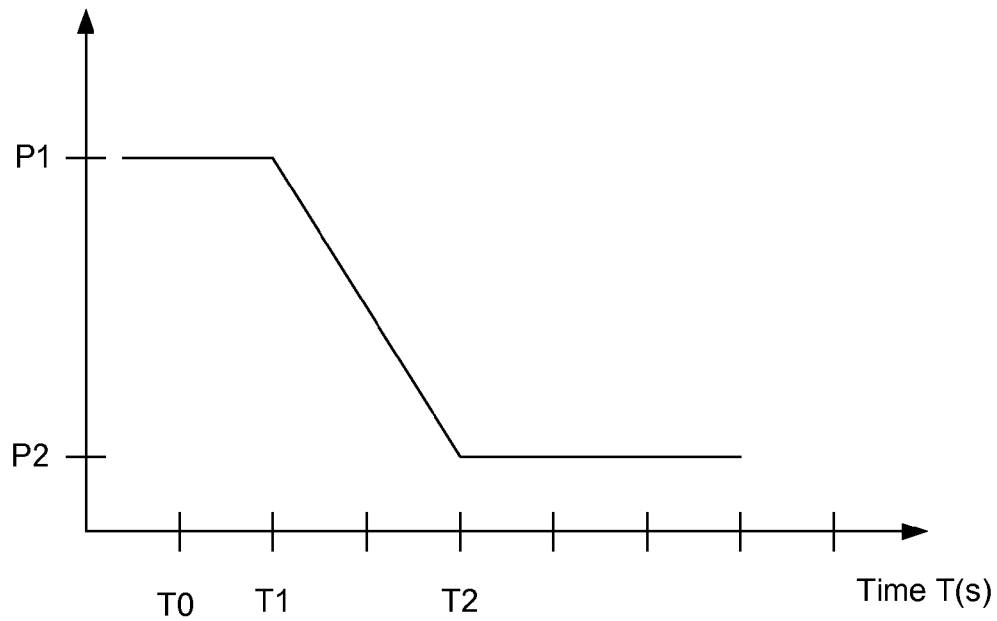
FIG. 4a schematically illustrates a diagram according to one aspect of the invention.

A diagram in which the pressure P of the reducing agent at the dosing unit 250 is given as a function of the time T is shown with reference to FIG. 4a. The pressure P can be measured by means of the pressure sensor 279. Alternatively, the pressure P can be calculated by means of the first control unit 200 in a suitable manner. Dosing of the reducing agent is turned off at a point in time T0. At a point in time T1, a pressure reduction of the reducing agent in the dosing unit from a first predetermined pressure level P1 to a second predetermined pressure level P2 is initiated. The point in time T1 occurs at a certain predetermined period of time after T0. This period of time can be a suitable period of time, such as 2 seconds. FIG. 4a shows an example in which the pressure reduction occurs steplessly. At a certain period of time after T1, at a point in time T2, the pressure P has reached the second predetermined level P2. The predetermined period of time between the point in time T1 and the point in time T2, and thus the pressure-reduction rate, can depend on, for example, various operational factors for the vehicle. The first pressure level P1 can be, for example, 9 bars. The second pressure level P2 can be, for example 2 bars. The period of time between the points in time T1 and T2 can be, for example, 5 seconds. In connection with the initiation of the dosing of reducing agent by means of the dosing unit 250, the pressure P can be adjusted to a suitable pressure level, e.g. to the first pressure level P1, in a suitable manner, e.g. steplessly.

According to one exemplary embodiment, the pressure P1 can, where appropriate, be reduced directly to the pressure P2. According to one exemplary embodiment, the pressure P2 can, where appropriate, be increased directly to the pressure P1.

Figure 4B:
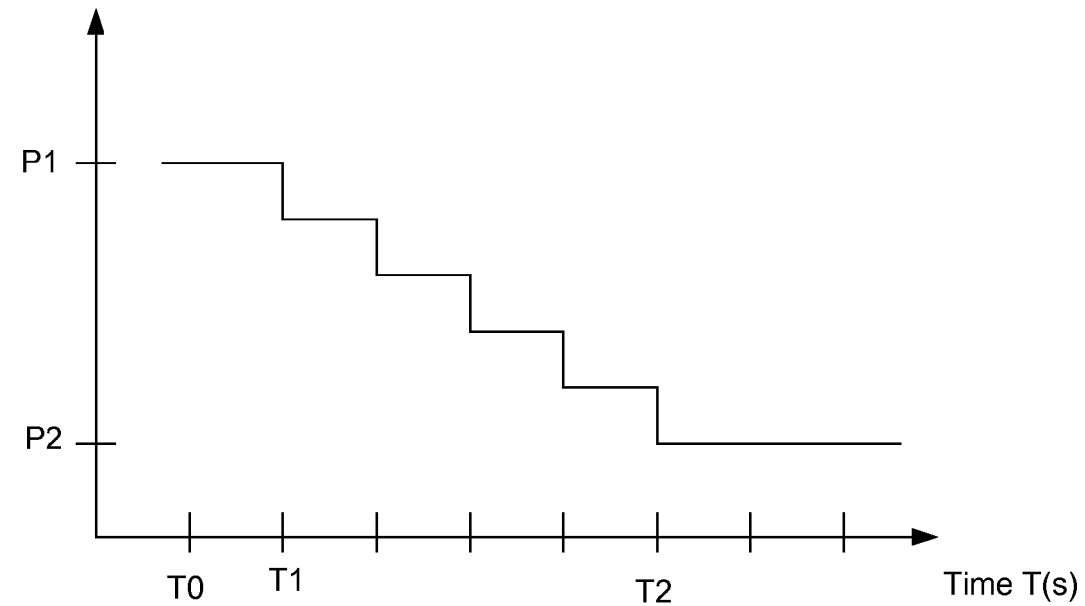
FIG. 4b schematically illustrates a diagram, according to one aspect of the invention.

A diagram in which the pressure P of the reducing agent at the dosing unit 250 is given as a function of the time T is shown with reference to FIG. 4b. The pressure P can be measured by means of the pressure sensor 279. Alternatively, the pressure P can be calculated by means of the first control unit 200 in a suitable manner. Dosing of the reducing agent is turned off at a point in time T0. At a point in time T1, the pressure reduction of the reducing agent in the dosing unit 250 from a first predetermined pressure level P1 to a second predetermined pressure level P2 is initiated. The point in time T1 occurs at a certain predetermined period of time after T0. This period of time can be a suitable period of time, e.g. 2 seconds. An embodiment in which the pressure reduction occurs in a suitable number of steps, e.g. 5 steps, is illustrated in FIG. 4b. The steps can mutually be of equal magnitude. At a certain period of time after T1, at a point in time T2, the pressure P has reached the second predetermined level P2. The predetermined period of time between the point in time T1 and the point in time T2 can, like the steps in which the pressure reduction occurs, depend on various operational factors for the vehicle. The first pressure level P1 can be, for example, 9 bars. The second pressure level P2 can be, for example, 2 bars. The period of time between points in time T1 and T2 can be, for example, 5 seconds. A step can be, for example, 1 or 2 bars. In connection with the initiation of the dosing of reducing agent by means of the dosing unit 250, the pressure P can be adjusted to a suitable pressure level, e.g. to the first pressure level P1, in a suitable manner, e.g. steplessly.

Figure 4C:
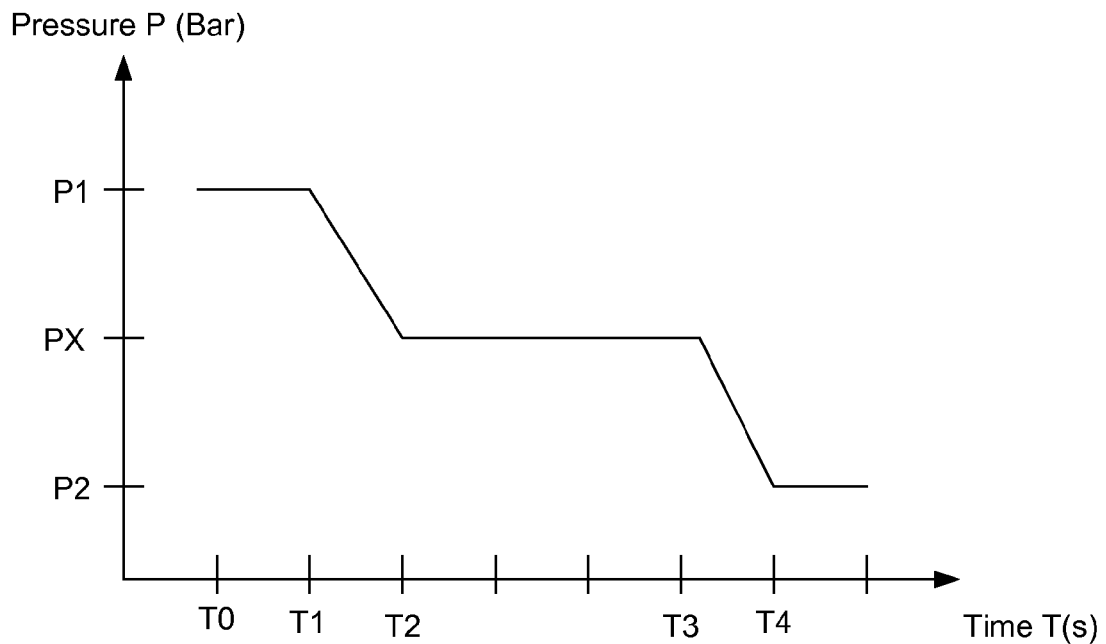
FIG. 4c schematically illustrates a diagram according to one aspect of the invention.

A diagram is shown with reference to FIG. 4c in which the pressure P of the reducing agent at the dosing unit 250 is given as a function of the time T. The pressure P can be measured by means of the pressure sensor 279. Alternatively, the pressure P can be calculated by means of the first control unit 200 in a suitable manner. Dosing of the reducing agent is shut off at a point in time T0. At a point in time T1, a pressure reduction of the reducing agent in the dosing unit 250 from a first predetermined pressure level P1 to a predetermined pressure level PX is initiated. The point in time T1 occurs at a given predetermined period of time after T0. This period of time can be a suitable period of time, e.g. 5 seconds. FIG. 4c illustrates an embodiment in which the pressure reduction occurs in two steps. At a given period of time after T1, a pressure reduction is initiated when the pressure is steplessly reduced from the first predetermined pressure level P1 to the pressure level PX. The pressure P reaches the pressure level PX at a second point in time T2. The point in time T2 occurs at a given predetermined period of time after the point in time T1. This period of time can be a suitable period of time, e.g. 2 seconds. The predetermined period of time between the point in time T1 and the point in time T2, and thus the pressure reduction rate, can depend, for example, on various operational factors for the vehicle. The pressure level PX is thus maintained until a predetermined point in time T3. At the point in time T3, a second stepless pressure reduction from the pressure level PX to a second pressure level P2 is initiated. The pressure P reaches the pressure level P2 at a fourth point in time T4. The point in time T4 occurs at a given predetermined period of time after the point in time T3. This period of time can be a suitable period of time, e.g. 3 seconds. The predetermined period of time between the point in time T3 and the point in time T4, and thus the pressure reduction rate, can depend, for example, on various operational factors for the vehicle. The first pressure level P1 can be, for example, 10 bars. The second pressure level P2 can be, for example, 2 bars. The pressure level PX can be, for example, 5 bars. In connection with the initiation of the dosing of reducing agent by means of the dosing unit 250, the pressure P can be adjusted to a suitable pressure level, e.g. to the first pressure level P1, in a suitable manner, e.g. steplessly.

First adjusting the pressure P from said level P1 to the level PX and then waiting for a given period of time of advantageously creates an opportunity to assess and choose whether or not a further pressure reduction from level PX to the level P2 is to be performed. In the event that a further pressure reduction from level PX is unnecessary, a pressure increase to the level P1 can, at the start of dosing, be achieved relatively quickly compared to a pressure increase from pressure level P2 to pressure level P1.

Figure 4D:
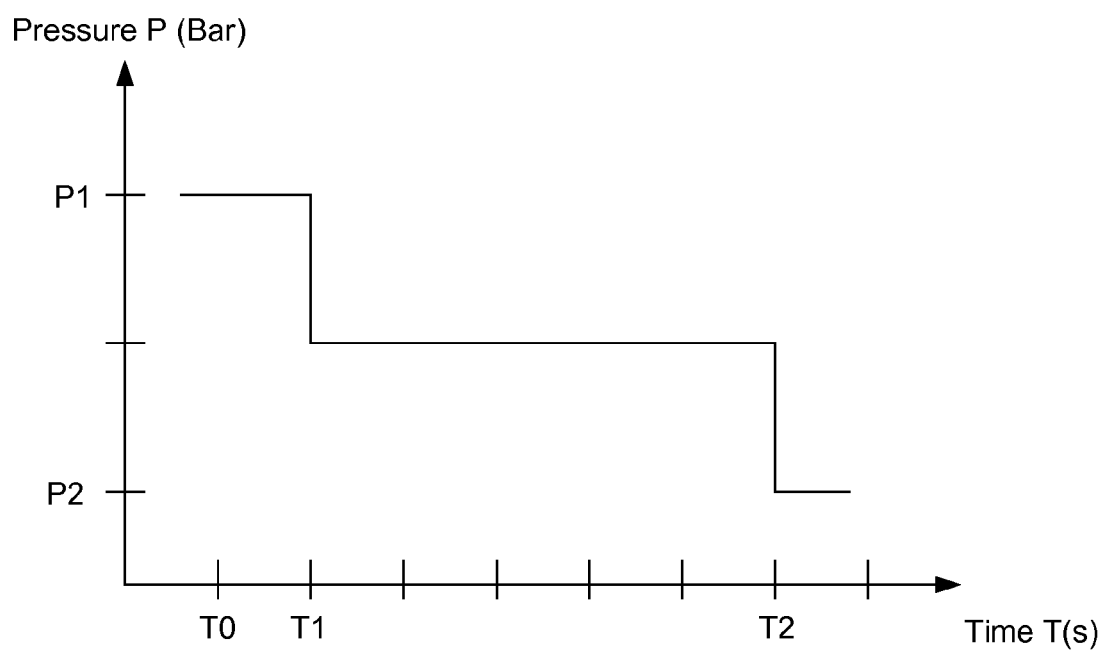
FIG. 4d schematically illustrates a diagram, according to one aspect of the invention.

A diagram in which the pressure P of the reducing agent at the dosing unit 250 is given as a function of the time T is shown with reference to FIG. 4d. The pressure P can be measured by means of the pressure sensor 279. Alternatively, the pressure P can be calculated by means of the first control unit 200 in a suitable manner. Dosing of the reducing agent is shut off at the time T0. At a point in time T1, a pressure reduction of the reducing agent in the dosing unit 250 from a first predetermined pressure level P1 to a pressure level PX is initiated. The point in time T1 occurs at a given predetermined period of time after T0. This period of time can be a suitable period of time, for example, 3 seconds. FIG. 4c illustrates an embodiment in which the pressure reduction occurs in two steps. At a given period of time after T1, a pressure reduction is initiated when the pressure is reduced to the level PX. At the point in time T2, which occurs a given predetermined period of time after T1, e.g. 10 seconds, a second pressure reduction from pressure level PX to a second pressure level P2 is initiated. The first pressure level P1 can be, for example, 15 bars. The second pressure level P2 can be, for example, 5 bars. The pressure level PX can be, for example, 10 bars. The pressure reductions thus occur essentially instantaneously. In connection with the initiation of the dosing of reducing agent by means of the dosing unit 250, the pressure P can be adjusted to a suitable pressure level, e.g. to the first pressure level P1, in a suitable manner, e.g. steplessly.

It should be noted that the pressure reduction of the reducing agent at the dosing unit 250 according to certain embodiments occurs only based on predetermined criteria. These criteria can consist, for example, of one or more of the following:

- the temperature of a suitable surface or component in the exhaust duct 290 or the exhaust in the exhaust duct 290 is below a given predetermined value, e.g. 200 degrees Celsius;
- deposits or reducing agent crystals have been detected in the exhaust system (duct 290, or in the dosing unit) 250:
- leakage of reducing agent from the dosing unit 250 has been detected.

Figure 5:
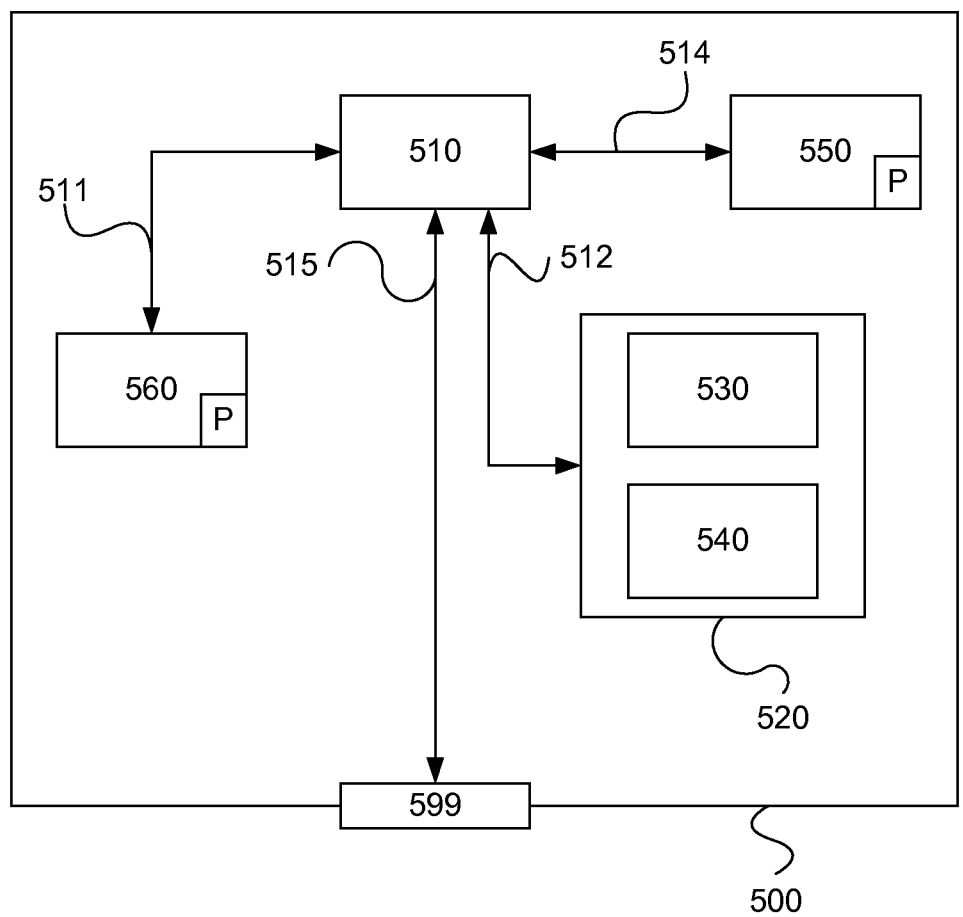
FIG. 5 schematically illustrates a computer according to one embodiment of the invention.

A diagram is presented of an embodiment of an apparatus 500 with reference to FIG. 5. The control units 200 and 210 described with reference to FIG. 2 can, in one embodiment, comprise the apparatus 500. The apparatus 500 contains a non-volatile memory 520, a data-processing unit 510 and a read/write memory 550. The non-volatile memory 520 has a first memory section 530 in which a computer program, such as an operating system, is stored in order to control the function of the apparatus 500. The apparatus 500 further contains a bus controller, a serial communication port, I/O devices, an A/D converter, a time and date input and transfer unit, an event counter and a termination controller (not shown). The non-volatile memory 520 also has a second memory section 540.

A computer program P is provided that can contain routines for reducing the pressure of a reducing agent in a dosing unit at an SCR system in order to prevent leakage of reducing agent when the dosing unit is closed. The computer program P can contain routines for reducing, during periods of non-continuous dosing of reducing agent during continued maintained operation of the pressurizing device 230, the pressure P of the reducing agent at the dosing unit 250 compared to the pressure during continuous dosing. The computer program P can contain routines for reducing the pressure P of the reducing agent at the dosing unit 250 by reducing the rpm of the pressurizing device 230. The computer program P can contain routines for reducing the pressure of the reducing agent at the dosing unit 250 by reducing the stroke rate of the pressurizing device 230.

The computer program P can contain routines for reducing the pressure of the reducing agent at the dosing unit 250 by controlling a valve configuration 288 on a downstream side of the dosing unit 250. The computer program P can contain routines for reducing the pressure of the reducing agent at the dosing unit 250 by controlling the conducting of the reducing agent from the pressurizing device 230 to the container 205 to bypass the dosing unit 250. The control can include the control of at least one valve configuration (not shown) in, for example, the line 274. The reducing agent can thus be conducted to bypass the dosing unit via the line 274. The computer program P can contain routines for reducing the pressure of the reducing agent at the dosing unit by controlling a feeding device 300 arranged downstream of the dosing unit. The computer program P can contain routines for reducing the pressure of the reducing agent at the dosing unit significantly. The computer program P can contain routines for reducing the pressure of the reducing agent steplessly. The computer program P can contain routines for reducing the pressure of the reducing agent stepwise. The computer program P can contain routines for increasing the pressure of the reducing agent at the dosing unit 250 in connection with resumed continuous dosing. The computer program P can contain routines for beginning pressure reduction of the reducing agent in the dosing unit 250 at a predetermined time prior to a set point in time when continuous dosing of reducing agent is to cease.

The program P can be stored in an executable form or in a compressed form in a memory 560 and/or in a read/write memory 550.

When it is stated that the data-processing unit 510 performs a given function, it is to be understood that the data-processing unit 510 executes a certain part of the program that is stored in the memory 560, or a certain part of the program that is stored in the read/write memory 550.

The data-processing device 510 can communicate with a data port 599 via a data bus 515. The non-volatile memory 520 is intended to communicate with the data-processing unit 510 via a data bus 512. The separate memory 560 is intended to communicate with the data-processing unit 510 via a data bus 511. The read/write memory 550 is arranged to communicate with the data-processing unit 510 via a data bus 514. For example, the links L210, L230, L240, L250, L255, L260, L265, L279, L288 and L300 can be connected to the data port 599 (see FIG. 2*a* and FIG. 2*b*).

When data are received at the data port 599, they are stored temporarily in the second memory section 540. Once received input data have been stored temporarily, the data-processing unit 510 is arranged to execute code in a manner as described above.

According to one embodiment, signals received at the data port 599 contain information about a prevailing pressure P of the reducing agent in the dosing unit 250. According to one embodiment, signals received at the data port 599 contain information about a prevailing temperature of a suitable surface or component of the exhaust duct 290 and/or a prevailing temperature of the exhaust in the exhaust duct 290.

The signals received at the data port 599 can be used by the device 500 to lower the pressure of a reducing agent in the dosing unit 250 in an SCR system in order to prevent leakage of reducing agent when the dosing unit is closed.

Parts of the methods described herein can be carried out by the apparatus 500 with the help of the data-processing unit 510, which runs the program stored in the memory 560 or the read/write memory 550. When the apparatus 500 runs the program, the methods described herein are carried out.

The foregoing description of the preferred embodiments of the present invention has been provided for illustrative and descriptive purposes. It is not intended to be exhaustive, or to limit the invention to the variants described. Many modifications and variations will obviously be apparent to one skilled in the art. The embodiments have been chosen and described in order to best explicate the principles of the invention and its practical applications, and to thereby enable one skilled in the art to understand the invention in terms of its various embodiments and with the various modifications that are applicable to its intended use.

The invention claimed is:

1. A method for controlling an SCR system, the method comprising:
   dosing a reducing agent into an engine exhaust duct upstream of an SCR catalytic converter in the engine exhaust duct for reducing the NOx level in an exhaust flow from the engine, the dosing including feeding, by a pump, the reducing agent from a container to a dosing valve configured to dose under pressure the reducing agent to the exhaust duct;
   entering a period of non-dosing of the reducing agent by turning off at a first time dosing of the reducing agent; and
   reducing at a second time subsequent to the first time, during the period of non-dosing of the reducing agent, the pressure of the reducing agent at the dosing valve compared to the pressure during dosing,
   wherein during the reducing of the pressure of the reducing agent, operation of the pump is continued maintained,
   wherein a time interval from the first time to the second time is a first predetermined time interval, and during the first predetermined time interval the pressure of the reducing agent at the dosing valve is maintained without reduction compared to the pressure during the dosing.

2. A method according to claim 1, wherein the reducing of the pressure of the reducing agent at the dosing valve comprises reducing rpm (RPM) of the pressurizing pump.

3. A method according to claim 1, wherein the reducing of the pressure of the reducing agent at the dosing valve comprises reducing a stroke rate of the pressurizing pump.

4. A method according to claim 1, wherein the reducing of the pressure of the reducing agent at the dosing valve comprises controlling a valve configuration on a downstream side of the dosing valve.

5. A method according to claim 1, wherein the reducing of the pressure of the reducing agent at the dosing valve comprises leading the reducing agent from the pressurizing pump to the container so as to bypass the dosing valve.

6. A method according to claim 1, wherein the reducing of the pressure of the reducing agent at the dosing valve comprises controlling a second pump arranged downstream of the dosing valve.

7. A method according to claim 1, wherein the reducing of the pressure of the reducing agent at the dosing valve comprises reducing the pressure from a first pressure level to less than a quarter of the first pressure level.

8. A method according to claim 1, wherein the reducing of the pressure of the reducing agent at the dosing valve comprises steplessly reducing the pressure of the reducing agent in the dosing valve.

9. A method according to claim 1, wherein the reducing of the pressure of the reducing agent in the dosing valve comprises stepwise reduction of the pressure.

10. A method according to claim 1, further comprising:
increasing the pressure of the reducing agent at the dosing valve in connection with resumed continuous dosing.

11. An SCR system configured to dose reducing agent into an engine exhaust duct upstream of a SCR catalytic converter for reducing the NOx level in an exhaust flow from the engine, wherein the SCR system comprises:
a dosing valve configured to dose under pressure the reducing agent to the exhaust duct;
a pressurizing pump configured to feed the reducing agent from a container to the dosing valve; and
a controller comprising a processor configured and operable to start a period of non-dosing of reducing agent by turning off, at a first time, dosing of the reducing agent, and then at a second time subsequent to the first time, during the period of non-dosing, to reduce a pressure of the reducing agent at the dosing valve compared to the pressure during dosing,
wherein during the reducing of the pressure of the reducing agent, operation of the pump is continued maintained,
wherein a time interval from the first time to the second time is a first predetermined time interval, and during the first predetermined time interval the pressure of the reducing agent at the dosing valve is maintained without reduction compared to the pressure during the dosing.

12. An SCR system according to claim 11, wherein the pump has controllable rpm (RPM).

13. An SCR system according to claim 11, wherein the pressurizing pump has a controllable stroke rate.

14. An SCR system according to claim 11, further comprising:
a second valve positioned downstream of the dosing valve.

15. An SCR system according to claim 11, wherein the controller is configured and operable to reduce steplessly the pressure of the reducing agent.

16. An SCR system according to 11, wherein the controller is configured and operable to reduce stepwise the pressure of the reducing agent.

17. An SCR system according to claim 11, wherein the controller is configured and operable to lead the reducing agent from the pressurizing pump to the container and bypassing the dosing valve.

18. An SCR system according to claim 11, further comprising: a second pump positioned downstream of the dosing valve.

19. A motor vehicle comprising an SCR system according to claim 11.

20. The method according to claim 1, wherein the first predetermined time interval is 2 seconds.

* * * * *